No. 747,454. PATENTED DEC. 22, 1903.
V. LOWENDAHL.
ELECTRIC CONDUCTOR.
APPLICATION FILED FEB. 7, 1903.
NO MODEL.
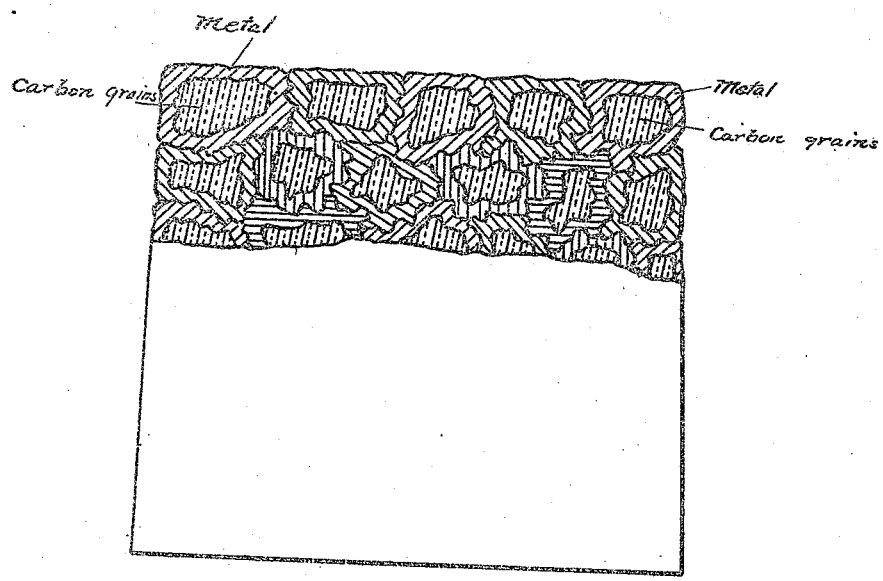
WITNESSES
INVENTOR
Victor Lowendahl
ATTORNEYS

UNITED STATES PATENT OFFICE.

VICTOR LÖWENDAHL, OF STOCKHOLM, SWEDEN.

ELECTRIC CONDUCTOR.

SPECIFICATION forming part of Letters Patent No. 747,454, dated December 22, 1903.

Application filed February 7, 1903. Serial No. 142,404. (No model.)

*To all whom it may concern:*

Be it known that I, VICTOR LÖWENDAHL, manager, of Regeringsgatan 30, Stockholm, in the Kingdom of Sweden, do hereby declare the nature of my invention for Improvements in the Manufacture of Electric Conductors, and in what manner the same is to be performed, to be particularly described and ascertained in and by the following statement.

The present invention relates to improvements in the manufacture of electric conductors which are suitable, among other applications, for use as brushes for dynamos and electric motors and combine the good qualities of both carbon and metal brushes and are at the same time free from the disadvantages connected therewith.

In the accompanying drawing is shown on an exaggerated scale a conductor partly in section.

Carbon brushes are well-known to be poorer conductors and to offer greater resistance to electricity than metallic brushes; but the sparking and the wear of the commutator when carbon brushes are used are so small in comparison to that which takes place with metallic brushes that carbon brushes are generally preferred when the construction of the machine permits. Carbon brushes, however, suffer from one serious disadvantage, more especially when the load is great—viz., that of depositing a layer of carbon on the commutator and at the same time throwing off sparks, which layer of carbon interferes with the working of the machine and must be removed daily. The formation of sparks is no doubt due to the fact that the carbon brushes consist of a mechanical mixture of carbon powder of a comparatively high conductivity and a coked adhesive of less conductivity, non-conductive passages and pores being left between the particles, which causes the current to pass chiefly in the form of sparks between the commutator and the portions of the brushes which conduct the best.

According to the present invention the above-mentioned disadvantages are lessened or overcome by manufacturing the electric conductors of grains of carbon coated by galvanic action—for instance, with a layer of metal (for instance, copper)—and subsequently compressed (preferably in a vacuum) without the use of any adhesive into a solid body of the desired shape and hardness. In this manner a perfectly homogeneous body is obtained which is free from passages and pores and forms a coherent metallic conductor with grains of carbon embedded therein and which not only has a higher conductivity and offers less resistance to the passage of the current than the above-mentioned conductors composed of carbon and a coked adhesive, but throws off no sparks and deposits no carbon on the commutator during use.

The high resistance to wear characteristic of the electric conductors made according to the present invention is due to the metallic envelops surrounding the carbon grains, when compressed being wrinkled so to mesh into each other and become connected together mechanically in the most intimate manner.

The accompanying drawing shows the grains of carbon and the metallic envelop designated by words applied thereto.

As an alternative the metal-coated grains of carbon may evidently be tinned before compression, in which case the strength of the finished conductor may be still further increased by heating it until soldering takes place, as also its strength may be increased by heating the compressed body to incipient or complete fusion simultaneously with or subsequently to the compression.

It may be mentioned that electric conductors have already been manufactured both of compressed metallic powder and of carbon and metal powders mixed; but such conductors, as regards sparking and wear on the commutator, are equivalent to metallic brushes, and the cohesion in these bodies compressed of ordinary metal and carbon grains is less strong than the cohesion in conductors manufactured according to the present invention.

Having now particularly described and ascertained the nature of my said invention and in what manner the same is to be performed, I declare that what I claim is—

1. An improved manufacture of electric conductors, wherein grains of carbon are coated with metallic envelops and are subsequently subjected to compression, with or without the application of heat, so as to cause the grains to adhere together mechanically and form a compact mass.

2. Electric conductors consisting of a compressed mass of grains of carbon coated with evenly-distributed metallic envelops, substantially as described.

In witness whereof I have hereunto set my hand in presence of two witnesses.

VICTOR LÖWENDAHL.

Witnesses:
T. RISBERG,
H. TELANDER.